April 18, 1961  E. HENSCHEN ET AL  2,979,954
RECORDING COMPRESSION GAUGE
Filed Oct. 17, 1956
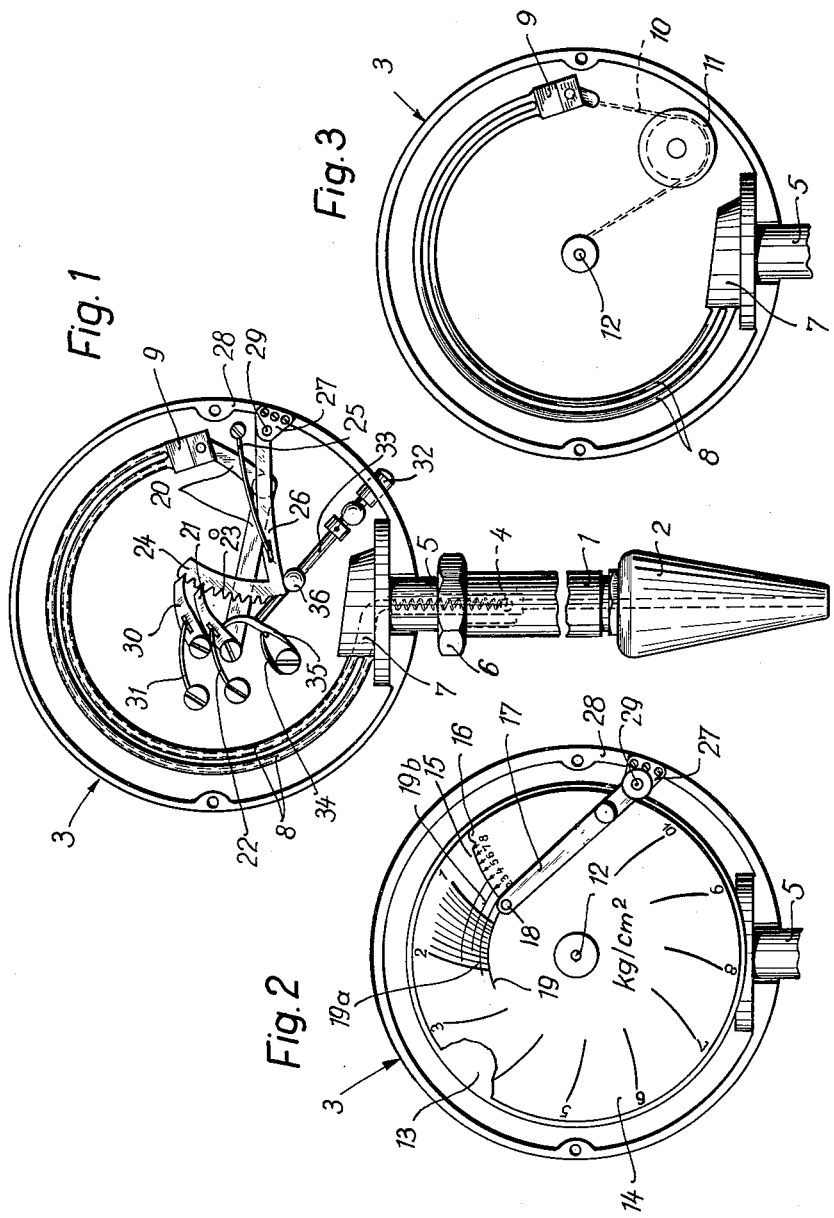
INVENTORS
Erwin Henschen
Paul Friedrich Laukhuf
By Richard Low

United States Patent Office 2,979,954
Patented Apr. 18, 1961

2,979,954

RECORDING COMPRESSION GAUGE

Erwin Henschen, Stuttgart, and Paul Friedrich Laukhuf, Eislingen, Germany, assignors to Walter Ziehr, Stuttgart, Germany Filed Oct. 17, 1956, Ser. No. 616,416

Claims priority, application Germany Mar. 21, 1956

3 Claims. (Cl. 73—391)

This invention relates to a recording compression gauge for motors, and more particularly to one which is operated by transmitting the pressure of the motor to the housing of the gauge. The transmission of the pressure takes place through a line which is connected to the motor by friction or threading. The pressure diagram is recorded by a stylus on a replaceable chart.

Compression gauges of known constructions have the disadvantage of requiring a writing tablet equipped with pins, bosses, etc. for positioning the chart. The tablet slides longitudinally in the gauge housing and must be held in the proper position for any one measurement by a spring registering with depression of a series of such depressions. For each new measurement, the tablet is moved up a certain distance by a handle. If the operator overlooks to move the tablet on, the recorded curves will cover one another and two measurements will be lost. And if the positioning spring does not properly enter the right depression, when the tablet is moved on after a measurement, it may happen that erroneous recordings are obtained.

Corresponding to the tablets of the known gauges, the charts are square or rectangular and are, therefore, provided with a scale of straight vertical lines on which the stylus which is fastened to a link of a system of links moves in a curvilinear path. The results of measurements are sometimes difficult to read from such a diagram system.

A spring-loaded controlling member to which the pressure of the motor is transmitted by a piston acts on a bifurcated lever arm of the member carrying the stylus. There are several friction points which may cause inaccurate readings and may even interfere with the recording. In addition, the connection between gauge housing and motor necessarily requires a multiplicity of individual parts.

The handles for holding the instruments of known designs and for advancing the tablets make for a bulky device. Also, the handle for advancing the tablet may unintentionally be actuated by an unhandy operator, making the next measurement incorrect and, thus, useless. The bulky design is inconvenient because it interferes with efficient packaging of the instrument and makes stacking of instruments for bulk shipment impossible.

One object of our invention is to overcome all the disadvantages and shortcomings of the known compression gauges and to provide instead a rugged instrument of very simple construction, that will be free from operating errors.

Other objects will appear from the following decription.

The specification is accompanied by a drawing in which:

Fig. 1 is a plan view of a recording compression gauge embodying features of our invention, also showing a joining member and the connecting line, the cover of the housing of the gauge being removed;

Fig. 2 is a plan view of the housing cover shown to carry the recording chart, a disc supporting the chart, and the holder of the stylus; and Fig. 3 is a plan view of the bottom portion of the housing, and of the tubular spring held by this bottom portion.

Referring to the drawing in greater detail, and initially to Fig. 1, the rubber cone 2 forming an end of the connecting line 1 is inserted where the spark plug or the ignition tube has been unscrewed from the motor. The connecting line 1 is connected to the joining member 5 which is equipped with a check valve 4 and is associated with the gauge housing generally designated 3 and is held in position by a nut 6.

A circularly bent tubular spring 8 disposed within the housing 3 ends within the socket 7 of the member 5. A "Perlon" string 10 or a similar device is fastened to the free end 9 of the tubular spring (see Fig. 3) and is trained over a grooved sheave 11, the other end of the string being secured to a central shaft 12 of the housing 3. This shaft carries the disc 13 (see Fig. 2) which supports the circular recording chart 14, the edge of which is provided with a scale 15 of curvilinear lines. The end of the scale is provided with several marks 16 corresponding to the individual cylinders of the motor. The stylus 18 is fastened to the holder 17 and rests upon the recording chart in the general area of the marks 16. As the chart rotates around the shaft 12, due to the pressure transmitted to the tubular spring 8 and due to the movement of the spring, caused thereby, the stylus traces the circular lines 19, 19a, 19b, etc., each of these lines corresponding to an individual measurement. The stylus holder 17 is swingingly supported on a pin 29 in an eyelet-like bearing 27 provided on the flange or rim 28 of the housing 3.

Also secured to the end 9 of the spring 8 is an angle lever 20. At its other end, the lever 20 has rigidly connected thereto a pawl 21 which is under the influence of a spring 22. Pawl 21 engages a toothed segment 24 forming an arm of another angle lever identified by the numerals 24, 26 and being under the influence of a spring 25. The arm 26 of the lever 24, 26 extends coaxially and is rigidly connected with the stylus holder 17, the lever 24, 26 being also carried by the pin 29.

When a measurement and recording has been completed, the compression gauge is removed from the motor and the pressure in the tubular spring is released by opening a valve (not shown). Spring 8, by reassuming its normal position, swings the lever 20 and moves at the same time the pawl 21 against the force of the spring 22. The pawl 21 causes the segment 24 to advance against the pressure of the spring 25 acting upon the arm 26. The angle lever 24, 26 transmits its movement, while swinging about the pin 29 to the stylus holder 17 which, as has been stated, is rigidly connected with the arm 26. In this way, the stylus is advanced after completion of each measurement from one scale mark to the next scale mark in the direction towards the edge of the chart. As soon as a new position of the toothed segment 24 of the angle lever 24, 26 is reacted, it is secured by the pawl 30 which is acted upon by the spring 31.

After several cylinders of a motor have been measured and the complete results for the motor appears recorded as a pressure diagram on a circular chart, a resetting device located in the area of the cooperating levers and pawls is actuated by a knob 32 which projects from the gauge housing. By means of the knob 32 a sliding bolt 33 is moved. The end of this bolt acts upon a click 35 against the pressure of the spring 34. The click bears against the pawl 21 and lifts it together with the pawl 30 out of engagement with the teeth 23. The angle lever 24, 26 then swings back into its initial position ready for a new measurement, and comes to rest against a stop 36 on the sliding bolt 33.

After the last measurement the recording chart may readily be removed whereupon a new chart is inserted.

It is believed that the construction and operation of a preferred form for practicing the invention, and the many advantages thereof, will be clearly understood from the foregoing detailed description. Some of the features and advantages are reviewed hereinafter.

The instrument of the invention makes it unnecessary to adjust the relative position of stylus and chart by hand after each measurement. This operation is performed automatically so that it is no longer possible to miss an adjustment which is required after each measurement, as may be the case with the instruments of conventional designs.

The recording compression gauge of the invention has the additional advantage of offering a longer scale, thereby permitting more precise readings.

It will be noted that our gauge includes a circular chart on the edge of which a curvilinear scale is provided. The chart is supported by a disc that is rotatably mounted on a central shaft in the cylindrical housing of the gauge. The housing consists of several parts. The disc is rotated by the movement of a tubular spring, which movement is caused by the compression in the cylinder being measured. The stylus touches the recording chart and traces circular lines on the chart. The movement of the tubular spring is transmitted to the central shaft and thereby to the disc which supports the recording chart by means of a string of "Perlon," "nylon," or other suitable material. The string runs over a grooved sheave and is fastened at one end to the movable end of the spring. Any other linkage of a similar action as the referred to strings may be used as well to connect the spring end with the central shaft.

The invention provides an angle lever secured to the free end of the tubular spring and being rigidly connected to a spring-loaded pawl which engages a toothed segment. The latter forms an arm of another angle lever which is spring-loaded and is mounted to swing about the same pivot as, and in rigid connection with, the stylus holder. The common bearing is provided in a flange or in the rim of the housing.

The pawl at the end of the angle lever that is connected to the tubular spring is coordinated with a second spring-loaded pawl to ensure a firm engagement of the pawl indirectly connected with the tubular spring in each position on the toothed segment.

Our invention further provides for a resetting mechanism arranged in the part of the gauge housing which holds the system of cooperating levers and pawls. The actuating knob of this resetting device projects to the outside of the housing. The device includes a sliding bolt, in front of which there is a swivel click which abuts against the pawl indirectly connected with the tubular spring. The sliding bolt carries a stop, on which the angle lever carrying the toothed segment rests upon resetting.

In order to prevent an involuntary shifting of the stylus when strong pressure variations occur, a check valve is provided in the member joining the gauge housing with the line leading to the motor.

It will be apparent that while we have shown and described our invention in one form only many changes and modifications may be made without departing from the spirit of the invention defined in the appended claims.

We claim:

1. A gauge for recording the compression of a motor cylinder and the like, comprising, in combination, a support; a disc mounted on said support for rotation about an axis, said disc being adapted to carry a recording chart; a pressure sensitive elongated arcuate tubular spring member formed with a cavity therein and responsive to a change of pressure of a fluid in said cavity for relative movement of two portions thereof relative to each other, one of said portions being secured to said support, and the other one of said portions being free to move relative to said support responsive to said change in pressure toward and away from a predetermined position thereof; means connecting said free portion to said disc for rotation of the latter jointly with the movement of said free portion; a conduit for releasably connecting said cavity with said motor cylinder; pivot pin means on said support; a stylus holder on said pivot pin means; stylus means mounted on said holder for recording a line on said chart during rotation of said disc, said stylus holder being pivoted to said support for movement of said stylus between a plurality of fixed positions radially spaced from each other relative to said axis; and pivoting means mounted on said support and operatively connected to said free portion and to said stylus holder for moving said stylus means from one to another of said radial positions thereof when said free portion moves in a direction toward said predetermined position, said pivot pin means being radially spaced from said axis and arranged for pivoting movement of said support about an axis substantially parallel to said first-mentioned axis, said pivoting means including a first angle lever having one end swingingly attached to said free portion of said spring member, a spring loaded pawl rigidly connected to the other end of said first lever, and a second angle lever having one arm mounted on said pivot pin means and rigidly connected with said stylus support, and another arm shaped to form a toothed segment and engageable by said pawl for advance of said segment by one tooth when said free portion of said spring member moves toward said predetermined position thereof.

2. A gauge as set forth in claim 1, said pivoting means further including a second spring loaded pawl cooperating with said first-named pawl and engageable with said toothed segment for securing the same in the advanced position.

3. A gauge as set forth in claim 1, and further including a spring-loaded click engaging said pawl, a sliding bolt extending from outside the housing, for actuation from the outside, into the housing to strike against said click and thus to disengage said pawl from said toothed segment, the sliding bolt being provided with an abutment, said second angle lever being adapted, upon the said disengagement, to swing against, and to rest on, said abutment.

References Cited in the file of this patent

UNITED STATES PATENTS

| | | |
|---|---|---|
| 829,614 | Wolfe | Aug. 28, 1906 |
| 877,198 | Jerauld | Jan. 21, 1908 |
| 951,658 | Phillips | Mar. 8, 1910 |
| 1,280,354 | Zigler et al. | Oct. 1, 1918 |
| 1,693,701 | Merrick | Dec. 4, 1928 |